3,267,055
RAPID CURING POLYESTER COMPOSITION COMPRISING A PEROXIDIC POLYMERIZATION CATALYST, A SECONDARY AMINE AND A COBALT COMPOUND SOLUBLE IN SAID COMPOSITION
Roger W. Amidon, Woodbury, Conn., assignor to United States Rubber Company, New York, N.Y., a corporation of New Jersey
No Drawing. Filed Mar. 17, 1961, Ser. No. 96,369
12 Claims. (Cl. 260—22)

This invention relates to the copolymerization of polyester resin compositions, and more particularly it relates to promotion of rapid and thorough setting or cure of polyester resin compositions by means of a ketone peroxide or aldehyde peroxide, cobalt, and an N-monoalkyl mono(monocyclicaryl) secondary monoamine.

The polyester resin compositions to which the invention applies are thermosetting mixtures of unsaturated polyester resins with copolymerizable ethylenically unsaturated monomers. Resinous compositions of this kind are well-known (see, for example, U.S. Patent 2,255,313, Ellis, September 9, 1941, and 2,667,430, Wells, January 26, 1954), and are much used as laminating, molding and casting compositions. Under the influence of various catalytic or promoting substances, these resinous compositions, which are initially liquid, or dough-like materials, can be converted into solid, insoluble and infusible shapes. This transformation is referred to as a setting or curing and is essentially a copolymerization of the unsaturated polyester with the added monomer, leading to a cross-linked polymer of exceedingly high molecular weight. Frequently the polymerization catalyst used for this purpose is an organic peroxide such as benzoyl peroxide. Various "promoters" are sometimes used along with the catalyst in order to shorten the time required for the cure. Thus, U.S. Patent 2,449,299, Hurdis, September 14, 1948, discloses the use of N-methylaniline or similar N-monoalkyl mono(monocyclicaryl) secondary monoamines as promoters for the benzoyl peroxide-catalyzed unsaturated polyester/copolymerizable monomer mixture. Unfortunately, this promoter is not effective when the catalyst is a ketone peroxide. Vandenberg, in U.S., Patent 2,610,965, September 16, 1952, proposed the use of certain basic nitrogen compounds along with alpha, alpha-dialkylarylmethyl hydroperoxides, such as cumene hydroperoxide, and an organic-soluble heavy metal compound such as a cobalt compound, for the purpose of accelerating the polymerization of vinylidene compounds. However, it has been desired to provide still more effective promoting systems for polyester resin compositions.

The problem to which the invention is essentially directed is that of providing for the cure of a polyester resin composition in such a manner that not only is the time required for the composition to reach a solid, or "gel," state minimized, but also the cure must do what is called "follow through," that is, the curing reaction must continue rapidly and effectively to produce a final resinous product which is hard and strong, as distinguished from a weak, relatively soft, or cheesy mass. This problem is of particular importance in ambient temperature cures, such as are commonly employed in the manufacture of resin-glass fiber laminated boats and the like, and the problem is also acute in the formulation of repair putties for automobile bodies, and the like.

In accordance with the invention, I have now found, unexpectedly, that polyester resin-copolymerizable monomer compositions of the kind described can be cured with unusual rapidity and effectiveness by using a ketone peroxide or aldehyde peroxide as the polymerization catalyst or initiator along with a soluble cobalt compound and an N-monoalkyl mono(monocyclicaryl) secondary monoamine, in which the alpha carbon atom of the alkyl group is a primary carbon atom, as promoters. In this way I have found it possible to achieve minimum gel times, with excellent follow through of the cure, even in normally slow-curing polyester compositions.

In more detail, the unsaturated polyester resin employed in the invention may be defined as a self-condensation product of an ester of a polyhydric alcohol with a polycarboxylic acid, at least one of which is unsaturated. Frequently the unsaturated polyester is made from one or more glycols and one or more alpha, beta-ethylenically unsaturated polycarboxylic acids. By way of non-limiting example, it may be mentioned that polyesters can be prepared from such acids as maleic, fumaric, aconitic, mesaconic, citraconic, ethylmaleic, pyrocinchoninic, veronic, or itaconic acid (with or without such acids as adipic, succinic, sebacic, phthalic, etc., or such acids as linolenic, linoleic, elaeosteric, etc.) with such glycols as ethylene, diethylene, triethylene, polyethylene, 1,3-propylene, 1,2-propylene, dipropylene (1,3 or 1,2), butylene or styrene glycol.

The copolymerizable ethylenically unsaturated monomers suitable for mixing with the foregoing unsaturated polyesters to produce the desired thermosetting composition are also well-known and are described in full detail in the patents previously referred to. Copending application Serial No. 818,246, filed June 5, 1959, now abandoned, contains a particularly extensive disclosure of such monomers, and such disclosure is therefore incorporated herein by reference as showing representative monomers, any and all of which may be mixed with the polyester for use in this invention. Among the more important such monomers may be mentioned styrene, vinyl toluene, methyl methacrylate, vinyl acetate, diallyl phthalate and triallyl cyanurate.

The relative proportions of polyester and copolymerizable monomer employed in this invention may be the same as in conventional practice. As a guide, it may be mentioned by way of non-limiting example that the amount of polyester will usually fall within the range of from 20% to 95% by weight of the mixture of polyester and copolymerizable monomer.

The invention has particular application to unsaturated polyester resins in which at least a portion of the acid component is made up of abietic acid or a substance containing substantial amounts of abietic acid, such as rosin (e.g., wood rosin, gum rosin, tall oil rosin). Such polyesters are described in detail in U.S. Patent 2,938,006, Root, May 24, 1960, the disclosure of which is hereby incorporated herein by reference to avoid needless repetition. Briefly, an especially preferred polyester resin for use in this invention may be described as a polymerizable solid Diels-Alder reaction product of a material selected from the group consisting of rosin and abietic acid with a fumarate polyester of a glycol and fumaric acid, in which resin the proportion of said material ranges from about 30 to about 230 grams for each gram-mole of the fumaric acid constituent of the fumarate polyester, and the said reaction product containing double bonds attributable to unreacted fumarate groups. Such abietic acid-derived polyester resin composition presents a particularly difficult problem in applications where it is necessary or desirable to carry out the cure at ordinary ambient temperatures (e.g., frequently 15° C. to 35° C.). If such polyester resin/copolymerizable monomer composition, derived in part from abietic acid, is cured with a catalyst which operates at elevated temperatures, such as benzoyl peroxide, no particular problem arises, and by heating at a sufficiently elevated temperature for a sufficient length of time a product that is hard and strong, and has good physical properties, can be obtained. However, if it is attempted to carry out the cure of such abietic acid-based polyester composition at lower, ambient temperatures, using a catalyst such as a ketone peroxide that yields free radicals at relatively low temperatures, it is unfortunately found that an excessively long period of time is required for the cure and/or the final product is soft and cheesy instead of being hard and strong. Extensive experimentation with numerous combinations of known promoters and catalysts has demonstrated that the problem of achieving a rapid and satisfactory ambient temperature cure of the abietic acid polyester system is an acute one that does not lend itself to ready solution with the aid of known promoted catalyst systems. Accordingly, a principal object of the invention is to provide an operable ambient temperature curing system for normally slow curing polyester resin compositions. The particular combination of promoting and catalytical materials by which this objective is achieved will now be described in more detail.

Considering first the catalyst or initiator employed in the invention, this may be any peroxidic polymerization catalyst which is a condensation product of a dialkyl ketone or an aldehyde with hydrogen peroxide. Such polymerization catalysts may be made in known manner by reacting, the hydrogen peroxide, a dialkyl ketone, typically a dialkyl ketone having a molecular weight of about 200 or less, such as dimethyl ketone, methyl ethyl ketone, methyl isobutyl ketone, methyl amyl ketone, in which category I include dialkyl ketones in which the alkyl groups are joined together to form a cyclic (cycloaliphatic) ketone, as in cyclohexanone or cyclopentanone. Such condensation products of hydrogen peroxide with dialkyl ketones are typically complex mixtures of a number of peroxidic materials, as is disclosed in more detail for example in "Organic Peroxides" by Tobolsky and Mesrobian (Interscience Publishers, New York, 1954), especially pages 43 ff., as well as "Studies in Organic Peroxides, XXIII," by Milas and Belic, J. Am. Chem. Soc., 81, 3358 (1959), and "Studies in Organic Peroxides, XXIV," by Milas and Golubovic, J. Am. Chem. Soc., 81, 3361 (1959). Similarly, suitable polymerization catalysts may be made condensing, with hydrogen peroxide, an aldehyde having a molecular weight of about 200 or less, including alkyl aldehydes such as acetaldehyde, butyraldehyde, or heptaldehyde, and aryl aldehydes such as benzaldehyde. Among the more important such condensation products of aldehydes or ketones with hydrogen peroxide may be mentioned the mixture derived from cyclohexanone and hydrogen peroxide. Such products may include some or all of the following: 1-hydroxy-cyclohexyl hydroperoxide, cyclohexylidene hydroperoxide, bis(1-hydroxycyclohexyl) peroxide, 1-hydroxy-1'-hydroperoxycyclohexyl peroxide, bis(1-hydroperoxycyclohexyl) peroxide, and trimeric cyclohexanone peroxide. Also important is the mixture of peroxides derived from methyl ethyl ketone hydrogen peroxide ((called methyl ethyl ketone peroxide), which is analogous to the mixture obtained from diethyl ketone and hydrogen peroxide. The latter product contains some or all of the following:

1,1,4,4,7,7-hexaethyl-1,4,7-cyclononatriperoxane;
1,1,4,4,7,7,10,10-octaethyl-1,4,7-triperoxy-1,10-dihydroperoxide;
1,1,4,4,7,7-hexaethyl-1,4-diperoxy-1,7-dihydroperoxide;
3,3'-dihydroperoxy-3,3'-dipentyl peroxide;
3-hydroxy-3'-hydroperoxy-3,3'-dipentylperoxide;
3,3-dihydroperoxy pentane; and
3-hydroxy-3-hydroperoxy pentane.

Among the important catalytic materials useful in the invention derived by condensing aldehydes with hydrogen peroxide may be mentioned the 1-hydroxyalkylhydroperoxide-1, and the bis compounds bis(1-hydroxyalkyl) peroxides, and related peroxides. Because of the difficulty of characterizing or identifying the peroxidic polymerization catalysts of the present class they are invariably referred to simply as ketone peroxides or aldehyde peroxides, meaning that they are reaction products (in many cases complex mixed reaction products of not fully understood structure) of ketones and/or aldehydes with hydrogen peroxide, that cannot otherwise be defined. However, such catalysts are well known and in some cases form the basis of commercially available catalyst compositions.

It should be pointed out that the peroxidic catalysts employed in the invention include compounds that are characterized by the fact that there are two oxygen atoms attached directly to a carbon atom. Each such oxygen atom is typically part of a peroxy linkage and therefore the present catalysts are characterized as containing polyperoxides. Some of the products include compounds in which one of such oxygen atoms is a part of a peroxide linkage, while the other oxygen atom is a part of a hydroxy group. In any case the catalytic peroxides employed herein are quite distinct from the catalysts employed in the Vandenberg patent referred to above, which have only one oxygen atom joined directly to a carbon atom.

Reference may be had to British Patent 604,580 of Du Pont for further information on the ketone peroxide or aldehyde peroxide catalysts employed in this invention. The disclosure of that patent is hereby incorporated herein by reference, as describing preferred polyperoxide catalysts, any or all of which may be used in the present invention.

I employ the peroxidic catalysts in the same catalytic amounts as are conventionally used for catalyzing polyester resins, usually in amount of from 0.2 to 3% by weight of the polyester-monomer composition, although other amounts may be used. Larger amounts of catalyst, such as 4 or 5%, can be used but are generally without proportionate added advantage and for reasons of economy are usually not used.

With regard to the promoters employed in the invention, these are, as indicated, cobalt and N-monoalkyl mono(monocyclicaryl) secondary monoamines in which the alpha carbon atom of the alkyl group is a primary carbon atom. The latter may be represented by the formula

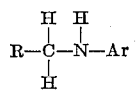

wherein R is hydrogen or an alkyl or hydroxyalkyl having from 1 to 6 carbon atoms or phenyl, and wherein Ar is phenyl or an alkylphenyl in which the alkyl groups have up to 7 carbon atoms. Examples of such compounds are N-methyl aniline, N-ethyl aniline, N-n-propyl aniline, N-n-butyl aniline, N-isopentyl aniline, N-benzyl aniline, N-beta-hydroxyethyl aniline, N-methyl toluidine, etc. I typically used such secondary amine in amount of from 0.03 to 1%, preferably 0.08 to 0.3% by weight, based on the polyester/monomer mixture, but other amounts can be used. Larger amounts, such as 2% or more, can be used but are usually without proportionate added advantage, and for reasons of economy are not ordinarily used.

With further regard to the just-defined class of secondary amines employed in the invention, it is desired to emphasize that the alpha carbon atom of the alkyl substituent must be a primary carbon atom, in order for the chemical to be operative in the present invention. Thus, N-isopropylaniline, when used with cobalt and ketone or aldehyde peroxide catalyst, does not produce the desired reduction in gel time, or it does not produce rapid curing of the polyester composition.

The cobalt I employ in the form of any soluble (in the resin composition) cobalt compound, whether organic or inorganic, such as cobalt salts of fatty or aromatic acids, e.g., cobalt acetate, octoate, naphthenate, cobalt oxide or hydroxide, cobalt salts of inorganic acids (e.g., cobalt chloride or nitrate), etc. The prior art discloses many other soluble cobalt compounds, any and all of which may be used in the invention. The function of such cobalt compound is to provide cobalt ions in the composition. Usually I employ from 0.002 to 0.04% preferably to 0.006 to 0.01% by weight of cobalt, based on the weight of the polyester/monomer mixture. While larger amounts, such as 0.1% or more, can be used, such larger amounts are usually without proportionate added advantage, and for reasons of economy are not ordinarily used.

In commercial practice the polyester resin compositions usually also further include inhibitors of polymerization or stabilizers for the purpose of preventing premature gellation of the composition during storage or shipment. Conventional inhibitors or stabilizers include hydroquinone, tertiary butyl catechol, quinone, amine salts, quartenary salts, hydrazonium salts and small amounts of copper compounds. However, as far as the mode of action of the present catalyst-promoter system is concerned such inhibitors are optional, and may be either present or absent.

A preferred commercial practice is to add the cobalt and the defined secondary amine (and any desired inhibitor) to the polyester resin composition at the factory where the composition is manufactured. The composition is thus stored and shipped to the customer without any catalyst therein. The customer then adds the catalyst just prior to use of the composition.

The composition of the invention is characterized by the ability to cure with remarkable rapidity, to produce a cross-linked product having excellent physical properties. The time required for the composition to gel to a solid state is relatively brief, and the cure follows through or continues vigorously until the product is hard and strong. The cure takes place readily at room temperature, although heat may be applied if desired (e.g., a temperature of 50° C. to 150° C. for a period of from ¼ hour to 2 hours) particularly during the final stages of the cure.

The following examples will serve to illustrate the practice of the invention in more detail.

*Example 1*

A polyester was prepared from 148 parts (all quantities are expressed herein by weight) of phthalic anhydride, 98 parts of maleic anhydride and 160 parts of 1,2-propylene glycol. The components were heated at 200° C. while sweeping carbon dioxide gas therethrough until the acid number had fallen to 45. The resulting alkyd was cooled to 165° C. and hydroquinone was added as an inhibitor in such amount as to provide a concentration of 85 p.p.m. (parts per million) of the inhibitor. Copper naphthenate was also added in such amount that the final concentration of copper in the resin composition was one p.p.m. Styrene was added to the alkyd at a temperature of about 115° C. in such an amount that the final resin composition contained 33% of the styrene monomer.

Portions of the resin, each containing 600 grams, were put into glass containers and to each of these there was added 1.5 grams of commercial cobalt octoate (12% cobalt). To the separate resin portions were then added 0.0805 moles of several N-substituted anilines, indicated in Table I, below.

The solutions were allowed to stand for 30 days, and then 1 ml. (about 1 gram) of a 15% solution of methyl ethyl ketone peroxide in dimethyl phthalate was added, as a catalyst, to a 100 gram portion of each resin solution at a temperature of 85° F. A portion of the thus-catalyzed resin was then poured into a 7.5 cm. by 1.0 cm. test tube to a depth of 5 cm. and a thermocouple was positioned in the center of the resin mass near the bottom of the test tube. The tube was then placed in an air bath thermostatically controlled at a temperature of 85° F. The gelation time of the resin was observed in the remaining resin. The reactivity of the promoted, catalyzed resin was determined by the degree of reaction as measured by the maximum temperature reached during the polymerization. Pertinent information is recorded in the following Table I, in which the "Gelation Time" is the time required for the resin to become jelly-like in consistency, the "Exotherm Time" is the time required to achieve a maximum temperature during the cure, and the "Exotherm Maximum" is the maximum temperature achieved during the cure.

| N-Substituent in Aniline | Gelation Time | Exotherm Time | Exotherm Maximum, °C. |
|---|---|---|---|
| N-ethyl | 8'1" | 20'49" | 203 |
| N-beta-hydroxy ethyl | 9'16" | 20'6" | 206 |
| N-n-propyl | 7'50" | 23'33" | 169 |
| N-n-butyl | 6'50" | 20'45" | 183 |
| N-isopropyl | 16'57" | 42' | 103.5 |
| N-isopentyl | 6'26" | 19'17" | 191 |
| N-benzyl | 11'41" | 28'31" | 158 |

The foregoing data establish the fact that polyester resin containing the promoter-catalyst combination of the present invention is capable of gelling at essentially ambient temperatures within a remarkably short time. The cure continues vigorously as indicated by the relatively high "Exotherm Maximum" temperature, in all cases in which the amine of the invention was included. It is important to note that in the case of N-isopropyl aniline, the desired results were not obtained, that is, the material had a long gel time, and took a relatively long time to achieve its maximum temperature, indicating a very slow cure. The relatively low temperature developed (103.5° C.) is also indicative of insufficiently vigorous cure. This emphasizes the necessity for having a primary carbon atom in the alpha position in the alkyl substituent. In a similar series of experiments, using various N,N-dialkyl substituted anilines, the corresponding gelation times were comparatively prolonged, a longer time was required to achieve a maximum temperature, and the maximum temperature achieved was lower than with the above-tabulated corresponding mono-substituted anilines. These results emphasize the criticality of employing the particular N-mono-alkyl mono(monocyclicaryl) secondary monoamines, in which the alpha carbon atom of the alkyl group is a primary carbon atom, as required by the present invention. The results are particularly surprising in view of the fact that these amines, in the absence of cobalt, do not promote the methyl ethyl ketone peroxide cure of polyesters to a practical extent.

If Example 1 is repeated, without the inhibitor present, essentially similar results are obtained.

*Example 2*

This example employs a normally slow-curing polyester of the kind to which the invention is specially directed. Such polyesters present a particularly acute problem, since they are in general insufficiently responsive to known catalyst-promoter systems.

A polyester was prepared from 116 parts of fumaric acid, 134 parts of dipropylene glycol and 121 parts of wood rosin. The mixture was esterified at 200° C. for two hours and then heated at 235–240° C. for 30 minutes. Sufficient quinone was added to the alkyd thus formed to provide 100 p.p.m. of quinone in the final resin mix. The alkyd was diluted with styrene to yield a resin composition containing 40% of the styrene monomer. The composition contained sufficient copper naphthenate and copper sulfate to provide 1 p.p.m. of copper.

The composition was divided into portions each weighing 800 grams and to each of these 3.2 grams of commercial cobalt octoate (containing 12% cobalt) was added. Each portion was treated with 0.0134 mole of various N-substituted anilines, as shown in the table below. The thus-promoted resins were allowed to stand for five days. Then 200 gram portions were catalyzed with 1.0 gram of "Lupersol DDM," a 60% solution of methyl ethyl ketone peroxide in dimethyl phthalate. Fifteen grams of the catalyzed resin was poured into a polyethylene flat bottom container 3½" in diameter such that the layer of resin was about 0.19" thick. Thirty grams was poured into a second polyethylene container such that the layer of resin was about 0.38" thick. The time of gelation (at room temperature, about 80° F.) was recorded and the hardness of the curing resin was measured from time to time with a hardness testing device known as a Barcol impressor. The tester used on the thinner casting was that designated 935, and was designed to register at much lesser hardness than the tester used on the thicker specimens, namely, the tester known as 934-1. When gelation time had been exceeded by 15 minutes the castings were removed from the polyethylene containers and the rate of cure was traced by periodic measurement of the hardness of the castings. The following Table II shows the results.

TABLE II

| Secondary Amine | Gel Time | 15 g. Casting Hardness by Barcol 935 | | | 30 g. Casting Hardness by Barcol 934-1 | | |
|---|---|---|---|---|---|---|---|
| | | Elapsed time after gelation | | | | | |
| | | 30" | 60" | 2 hr. | 30" | 60" | 2 hr. |
| N-methyl aniline | 7' | 60 | 70 | 72 | 28 | 29 | 29 |
| N-n-propyl aniline | 7' | 60 | 72 | 72 | 28 | 28 | 29 |
| N-ethyl aniline | 8' | 60 | 65 | 65 | 30 | 32 | 32 |
| N-ethyl-p-toluidine | 7' | 55 | 60 | 60 | 25 | 27 | 30 |
| N-beta-hydroxyethyl aniline | 4' | 50 | 50 | 57 | 25 | 27 | 27 |
| N-isoamyl aniline | 10' | 30 | 40 | 50 | 30 | 30 | 30 |
| N-butyl aniline | 10' | 0 | 30 | 45 | 29 | 30 | 30 |

The remarkable nature of the foregoing results will be appreciated when it is considered that otherwise identical promoted resin compositions, containing only N-methyl aniline in the concentrations specified along with the catalyst, but containing no cobalt, had not gelled even after a period of 4 hours. Similarly, an otherwise identical resin composition which contained the cobalt and the catalyst without the substituted aniline required an intolerably long time of 1 hour and 15 minutes in order to gel, and at the end of 3 hours the hardness of the casting was so low that a reading was not obtained.

An aldehyde peroxide such as heptaldehyde peroxide may be substituted in the foregoing example with similar results.

*Example 3*

A resin was prepared similar to that described in the preceding example except that 151 parts of wood rosin was used in the polyester charge instead of 121 parts of wood rosin.

The promotion of the resin was accomplished in a fashion similar to that described in Example 2, that is, to 500 gram portions of the resin was added 2.5 grams of commercial cobalt octoate (12% cobalt) and 0.014 mole of various substituted anilines shown in the table below. The resins were catalyzed with 0.5% Lupersol DDM and castings were made as described in Example 2. The following results were obtained.

TABLE III

| N-substituent in Aniline | Gel Time | 15 Gram Casting Hardness Barcol 935 | | | 30 Gram Casting Hardness Barcol 934-1 | | |
|---|---|---|---|---|---|---|---|
| | | Elapsed time after gelation | | | | | |
| | | 30" | 60" | 2 hr. | 30" | 60" | 2 hr. |
| N-methyl | 12' | 57 | 60 | 60 | 27 | 30 | 30 |
| N-ethyl | 15' | 50 | 55 | 55 | 30 | 22 | 25 |
| N-beta hydroxyethyl | 5' | 50 | 50 | 50 | 20 | 27 | 25 |

In contrast to the foregoing results, an otherwise identical composition containing N-isopropyl aniline as the amine still did not have a measurable hardness, even after 2 hours in the 30 gram casting (as explained previously, N-isopropyl aniline is outside of the scope of the invention, since it does not have a primary alpha carbon atom, and is not operative in the invention). Similarly, N,N-dimethyl aniline, when substituted for the above amines in an otherwise identical composition, did not provide satisfactory results, and, in fact, it did not produce a measurable hardness even after 2 hours in the 30 gram casting. This emphasizes the criticality of employing a secondary amine of the kind described, rather than a tertiary amine such as N,N-dimethyl aniline.

The effect of the cobalt in the foregoing examples is particularly remarkable in view of the fact that if cobalt is added to a benzoyl peroxide-catalyzed polyester composition promoted with N-methyl aniline or the like, the cure actually slows down. Therefore, it was most unexpected to find that cobalt remarkably accelerates the cure in the presence of N-methyl aniline or the like, in the presence of the ketone peroxide catalyst as shown. These results are all the more remarkable and unexpected in view of the fact that secondary amines of the type represented by N-methyl aniline are ineffective as promoters of ketone peroxide catalyzed polyesters cures. Furthermore, if other peroxide catalysts, such as hydroperoxides of the type represented by alpha cumene hydroperoxide and tertiary butyl hydroperoxide, are substituted for the ketone peroxide in the present system, unsatisfactory results are obtained, even in the presence of cobalt and the presently used secondary amines. It will therefore be apparent that the invention achieves a remarkable synergistic improvement, that could not have been expected or predicted from the known effect of the catalyst and these promoters in various other combinations.

Having thus described my invention, what I claim and desire to protect by Letters Patent is:

1. A polyester resin composition capable of curing rapidly at ambient temperatures comprising from 20 to 95 parts by weight of a polymerizable solid Diels-Alder reaction product of a material selected from the group consisting of rosin and abietic acid with a fumarate polyester of a glycol and fumaric acid, in which reaction product the proportion of said material ranges from 30 to 230 grams for each gram-mole of the fumaric acid constituent of the fumarate polyester, and the said reaction product containing double bonds attributable to unreacted fumarate groups, and correspondingly 80 to 5 parts by weight of an ethylenically unsaturated copolymerizable monomer, from 0.2 to 3% of a peroxidic polymerization catalyst which is a reaction product of a substance selected from the group consisting of dialkyl ketones and alkyl aldehydes having a molecular weight not greater than 200 with hydrogen peroxide, and, as promoters, from 0.03 to 1% of a secondary amine of the formula

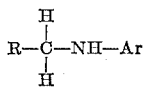

where R is selected from the group consisting of alkyl and hydroxyalkyl groups having from 1 to 6 carbon atoms and phenyl and Ar is selected from the group consisting of phenyl and alkylphenyl in which the alkyl group has from 1 to 7 carbon atoms, and from 0.002 to 0.04% of cobalt in the form of a cobalt compound soluble in said composition, the said percentages being by weight and being based on the combined weights of the said reaction product and copolymerizable monomer.

2. A composition as in claim 1 in which the said catalyst is a reaction product of a dialkyl ketone having a molecular weight not greater than 200 with hydrogen peroxide.

3. A composition as in claim 1 in which the said catalyst is a reaction product of an alkyl aldehyde having a molecular weight not greater than 200 with hydrogen peroxide.

4. A polyester resin composition capable of curing rapidly at ambient temperatures comprising from 20 to 95 parts by weight of a polymerizable solid Diels-Alder reaction product of a material selected from the group consisting of rosin and abietic acid with a fumarate polyester of a glycol and fumaric acid, in which reaction product the proportion of said material ranges from 30 to 230 grams for each gram-mole of the fumaric acid constituent of the fumarate polyester, and the said reaction product containing double bonds attributable to unreacted fumarate groups, and correspondingly 80 to 5 parts by weight of styrene, from 0.2 to 3% of a ketone peroxide polymerization catalyst which is a reaction product of a dialkyl ketone having a molecular weight not greater than 200 with hydrogen peroxide, and, as promoters, from 0.03 to 1% of a secondary amine of the formula

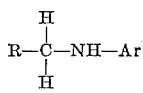

where R is selected from the group consisting of alkyl and hydroxyalkyl groups having from 1 to 6 carbon atoms and phenyl and Ar is selected from the group consisting of phenyl and alkylphenyl in which the alkyl group has from 1 to 7 carbon atoms, and from 0.002 to 0.04% of cobalt in the form of a cobalt compound soluble in said composition, the said percentages being by weight and being based on the combined weights of the said reaction product and styrene.

5. A composition as in claim 4 in which the said amine is N-methyl aniline.

6. A polyester resin composition capable of curing rapidly at ambient temperatures comprising from 20 to 95 parts by weight of a polymerizable solid Diels-Alder reaction product of a material selected from the group consisting of rosin and abietic acid with a fumarate polyester of a glycol and fumaric acid, in which reaction product the proportion of said material ranges from 30 to 230 grams for each gram-mole of the fumaric acid constituent of the fumarate polyester, and the said reaction product containing double bonds attributable to unreacted fumarate groups, and correspondingly 80 to 5 parts by weight of an ethylenically unsaturated copolymerizable monomer, from 0.2 to 3% of methyl ethyl ketone peroxide, and, as promoters, from 0.3 to 1% of a secondary amine of the formula

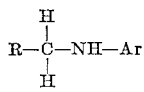

where R is selected from the group consisting of alkyl and hydroxyalkyl groups having from 1 to 6 carbon atoms and phenyl and Ar is selected from the group consisting of phenyl and alkylphenyl in which the alkyl group has from 1 to 7 carbon atoms, and from 0.002 to 0.04% of cobalt in the form of a cobalt compound soluble in said composition, the said percentages being by weight and being based on the combined weights of the said reaction product and copolymerizable monomer.

7. A polyester resin composition capable of curing rapidly at ambient temperatures comprising from 20 to 95 parts by weight of a polymerizable solid Diels-Alder reaction product of a material selected from the group consisting of rosin and abietic acid with a fumarate polyester of a glycol and fumaric acid, in which reaction product the proportion of said material ranges from 30 to 230 grams for each gram-mole of the fumaric acid constituent of the fumarate polyester, and the said reaction product containing double bonds attributable to unreacted fumarate groups, and correspondingly 80 to 5 parts by weight of an ethylenically unsaturated copolymerizable monomer, from 0.2 to 3% of a ketone peroxide polymerization catalyst which is a reaction product of a dialkyl ketone having a molecular weight not greater than 200 with hydrogen peroxide, and, as promoters, from 0.03 to 1% of N-beta-hydroxyethyl aniline, and from 0.002 to 0.04% of cobalt in the form of a cobalt compound soluble in said composition, the said percentages being by weight and being based on the combined weight of the said reaction product and copolymerizable monomer.

8. A composition as in claim 7 in which the said catalyst is methyl ethyl ketone peroxide.

9. A polyester resin composition capable of curing rapidly at ambient temperatures comprising from 20 to 95 parts by weight of a polymerizable solid Diels-Alder reaction product of a material selected from the group consisting of rosin and abietic acid with a fumarate polyester of a glycol and fumaric acid, in which resin the proportion of said material ranges from 30 to 230 grams for each gram-mole of the fumaric acid constituent of the fumarate polyester, and the said reaction product containing double bonds attributable to unreacted fumarate groups, and correspondingly 80 to 5 parts by weight of styrene, from 0.2 to 3% of methyl ethyl ketone peroxide, and, as promoters, from 0.03 to 1% of N-beta-hydroxyethyl aniline, and from 0.02 to 0.04% of cobalt in the form of cobalt octoate, the said percentages being by weight and being based on the combined weight of the said reaction product and styrene.

10. A method of curing a polyester resin composition rapidly at ambient temperature comprising providing a composition comprising 20 to 95 parts by weight of a polymerizable solid Diels-Alder reaction product of a material selected from the group consisting of rosin and abietic acid with a fumarate polyester of a glycol and fumaric acid, in which resin the proportion of said material ranges from 30 to 230 grams for each gram-mole of the fumaric acid constituent of the fumarate polyester, and the said reaction product containing double bonds attributable to unreacted fumarate groups, and correspondingly 80 to 5 parts by weight of an ethylenically unsaturated copolymerizable monomer, adding thereto, as promoters, from 0.03 to 1% of a secondary amine of the formula

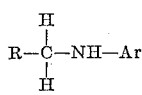

where R is selected from the group consisting of alkyl and hydroxyalkyl groups having from 1 to 6 carbon atoms and phenyl and Ar is selected from the group consisting of phenyl and alkylphenyl in which the alkyl group has from 1 to 7 carbon atoms, and from 0.02 to 0.04% of cobalt in the form of a cobalt compound soluble in said composition, adding to the composition from 0.2 to 3% of a peroxidic polymerization catalyst which is a reaction product of a substance selected from the group consisting of dialkyl ketones and alkyl aldehydes having a molecular weight not greater than 200 with hydrogen peroxide, the said percentages being by weight and being based on the combined weight of the said reaction product and copolymerizable monomer, and subjecting the composition to ambient temperatures within the range of from 15° to 35° C. whereby the composition cures to a hard, insoluble and infusible state.

11. A method as in claim 10 in which the catalyst is a reaction product of a dialkyl ketone having a molecular weight not greater than 200 with hydrogen peroxide.

12. A method as in claim 11 in which the catalyst is a reaction product of an alkyl aldehyde having a molecular weight not greater than 200 with hydrogen peroxide.

(References on following page)

References Cited by the Examiner

UNITED STATES PATENTS

| | | | |
|---|---|---|---|
| 2,449,299 | 9/1948 | Hurdis | 260—865 |
| 2,861,910 | 11/1958 | Johnston et al. | 260—75 |
| 2,938,006 | 5/1960 | Root | 260—26 |
| 2,973,332 | 2/1961 | Fikentscher et al. | 260—75 |
| 3,001,967 | 9/1961 | Willersinn | 260—868 |
| 3,079,363 | 2/1963 | Koch et al. | 260—45.4 |

LEON J. BERCOVITZ, *Primary Examiner.*

MILTON STERMAN, DONALD E. CZAJA,
*Examiners.*

R. W. GRIFFIN, *Assistant Examiner.*